W. I. TWOMBLY.
SPRING SUSPENSION FOR VEHICLES.
APPLICATION FILED DEC. 14, 1914.
1,171,007.
Patented Feb. 8, 1916.
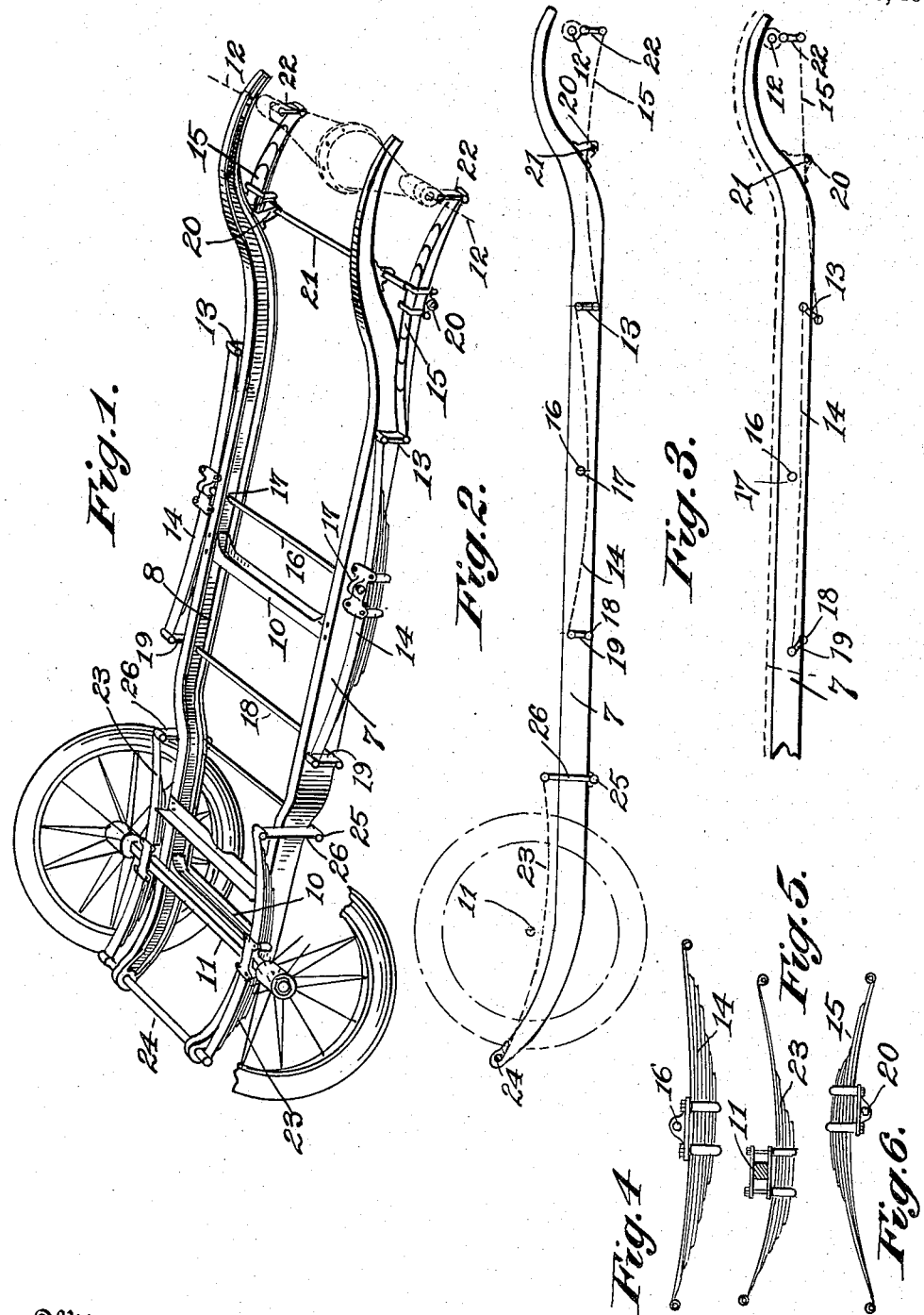
Witnesses:
R. M. Pittman
P. Philipp.
Inventor
Willard Irving Twombly
By his Attorney John O. Seifert

UNITED STATES PATENT OFFICE.

WILLARD IRVING TWOMBLY, OF NEW YORK, N. Y.

SPRING SUSPENSION FOR VEHICLES.

1,171,007.  Specification of Letters Patent.  Patented Feb. 8, 1916.

Application filed December 14, 1914. Serial No. 877,096.

*To all whom it may concern:*

Be it known that I, WILLARD IRVING TWOMBLY, a citizen of the United States, residing in the borough of Manhattan, in the city, county, and State of New York, have invented new and useful Improvements in Spring Suspensions for Vehicles, of which the following is a specification.

This invention relates to motor vehicles, and particularly to a spring suspension therefor.

It is the object of the invention to provide an improved spring suspension to absorb and reduce to a minimum the shocks or jars which are transmitted to the chassis frame and vehicle body from the wheels.

In carrying out the invention I provide a pair of rear leaf springs at each side of the vehicle, the springs of each pair connected at one end and fulcrumed to the frame, the free end of the front spring of each pair being connected to the frame, and the free end of the rear spring of each pair connected to the axle, the springs of each pair are arranged to act in opposite directions whereby the rebound of one spring will counteract the shock or rebound of the other spring. A pair of front springs are connected with the front axle the forward ends of the spring have a pivotal connection with the frame and the rear ends having a link connection with the frame.

In the drawing accompanying and forming a part of this specification, Figure 1 is a perspective view of the chassis frame of a motor vehicle showing an embodiment of my improved spring suspension applied thereto. Fig. 2 is a side elevation showing the spring suspension in normal position.
Fig. 3 is a view similar to Fig. 2 but showing the action of the spring suspension as the frame is subjected to a shock through the wheels and axles; and Figs. 4, 5 and 6 are side elevations of the component springs of the suspension and showing the manner of connecting them to the frame.

Similar characters of reference designate like parts throughout the different views of the drawing.

In the drawing I have shown my improved vehicle suspension in connection with the chassis frame of a motor vehicle by which the vehicle body and the power plant are supported, said frame consisting of a pair of side members 7, 8 which converge inward adjacent the forward ends to permit of a short turning radius of the vehicle. The front and rear extremities of these members are curved or bent upwardly, as shown in the drawing. The side members are connected by cross bars 10 and supported or suspended from the wheel axles 11, 12.

To suspend the rear of the chassis frame from the rear axle, I provide two pairs of semi-elliptical or leaf springs, one pair at each side of the frame, and the springs 14, 15 of each pair pivotally connected at one end by links 13. The springs of each pair have a fulcrum connection with the chassis frame one forward of the other, the forward spring being fulcrumed or pivotally supported on the projecting ends of a rod 16 extending transversely of and fixed in the side members of the frame, as at 17, with the forward ends of the spring connected to the projecting ends of a rod 18 extending transversely of and fixed in the frame by means of links 19. The fulcrum of the springs 14 is at a point substantially midway between its ends. The rear springs 15 of each pair are fulcrumed, as at 20, on the projecting ends of a rod 21 extending transversely of and fixed in the side members of the frame, the fulcrum of these spring being to the rear of a point midway between their ends, with the free ends of the spring pivotally connected by links 22 to the rear axle. These springs 14, 15 are arranged to act in opposite directions, as shown in the drawing so that the rebound of one spring will counteract the rebound of the other spring for a purpose to be hereinafter specified.

The forward end of the frame is suspended from the forward wheel axle by a pair of springs 23 fixed upon said axle forward of a point midway between the ends of the springs so that the extent of the springs forward of the axle will be of less length than the rear portion. The forward ends of said springs are pivotally connected to the projecting ends of a rod 24 extending transversely of and fixed in the ends of the side members of the frame, as clearly shown in Fig. 1. The rear ends of the springs are connected to studs 25 fixed in the frame by links 26.

In Fig. 2 I have shown the normal position of the frame relative to the springs, and in Fig. 3 in a diagrammatic manner the flexure of the frame with relation to the flexure of the springs when the frame is subjected to a shock or jar through the wheels and wheel axles. As the vehicle wheels ride over an obstruction and a consequent shock or jar is transmitted to the frame through the rear portion of the springs 15, said springs will be slightly rocked on their fulcrum 20. Simultaneously with such rocking of the springs 15 they are put under tension. The rocking and tensioning of the springs 15 through their link connection 13 with the springs 14 slightly rock said latter springs on their fulcrum and also put said springs under tension, causing them to straighten out or elongate which is permissible in view of their link connections at the ends with the rear springs 15 and the frame. It will thus be obvious that while the shock from the axle is transmitted to the spring suspension through the rear portions of the springs 15, the shock or jar is transmitted to the vehicle frame and body through the forward ends of the springs 15 and the springs 14, the greater portion of the shock being absorbed or cushioned by the springs 14.

The fulcruming of the springs 15 to the frame is preferably rearward of a point midway between the ends of said springs, thus shortening the length of such springs at the rear of their connection to the axle, and elongating the ends of the springs forward of their fulcrum. By so connecting the springs 15 to the frame as a vehicle wheel rides over an obstruction there will be a consequent short movement of the rear portions of said springs which would result in quick sudden shocks or jars to the vehicle frame. However, as the forward ends of the springs are of greater length not only is the leverage or movement of said forward ends of the springs greatly increased but also the resiliency and flexibility thereof. As the springs 15 are rocked and put under tension they will tend to straighten out and elongate and simultaneously therewith slightly rock the forward springs 14 on their fulcrum and tension or flex said springs, the flexure of the forward springs and the forward ends of the rear springs 15 being greater than the flexure of the rear portions of the springs 15 greatly increasing the resiliency and flexibility of said springs 14 and the forward ends of the springs 15, with the result that while the frame is slightly flexed or has a very short movement imparted thereto the springs 14 and the forward ends of the springs 15 will have a much greater movement (as shown in dotted lines in Fig. 3) and the shocks or jars to the frame will be cushioned and absorbed in the springs 14 and forward ends of the springs 15.

As shown the springs 14, 15 are semi-elliptical leaf springs and the springs are so arranged that they will act in opposite directions, that is, the action of the springs 15 will be opposite to the action of the springs 14 so that when the springs 15 are tensioned as the vehicle rides over an obstruction the rebound of such springs will be counteracted by the springs 14 and the rebound of the latter springs will be counteracted by the springs 15 with the result that the shock is absorbed in the springs making an easy and soft riding vehicle.

By connecting the springs 23 to the front axle so that the portion of the springs forward of their connection to the axle is of less length than the portion of the springs at the rear of their connection to the axle, as a front wheel rides over an obstruction and a shock or jar is transmitted through the axle to the frame and body, the movement of the forward end of the springs will be much less than the movement of the end portion of the springs at the rear of their connection to the axle, the increased length of such rear end of the springs increasing the resiliency and flexibility thereof and the link connection of the rear ends of the springs to the frame in the manner shown, results in the absorbing or cushioning of the shocks by such rear portions of the springs.

Having thus described my invention, I claim:

1. In a vehicle the combination with the frame and the wheel axles, of a pair of springs having a link connection at one end and a fulcrum connection with the frame, and the free ends of the springs pivotally connected, one to the frame and the other to an axle.

2. In a vehicle the combination with the frame and the wheel axles, of two pairs of springs, the springs of each pair having a link connection at one end and both springs of each pair fulcrumed to the frame, the free end of one spring of each pair having a link connection with the frame and the free ends of the other springs having a link connection with the axle.

3. In a vehicle the combination with the frame and the wheel axles, of two pairs of springs, the springs of each pair having a link connection at one end and both fulcrumed to the frame, the fulcrum of the rear spring of each pair being to the rear of a point midway the ends of the said spring, and the fulcrum of the other spring being substantially midway between its ends; and the free ends of one spring of each pair pivotally connected to the frame and the free end of the other springs pivotally connected to an axle.

4. In a vehicle the combination with the frame and the wheel axles, of two pairs of springs one pair at each side of the frame, the springs of each pair having a link connection at one end and fulcrumed to the frame, the fulcrum of the rear springs of each pair being in the rear of a point midway between the ends of said spring, and the free end of one spring of each pair pivotally connected to the frame and the free end of the other springs pivotally connected to an axle.

W. IRVING TWOMBLY.

Witnesses:
 JOHN Q. SEIFERT,
 LAURA E. SMITH.

Copies of this patent may be obtained for five cents each, by addressing the "Commissioner of Patents, Washington, D. C."